Figure 1:
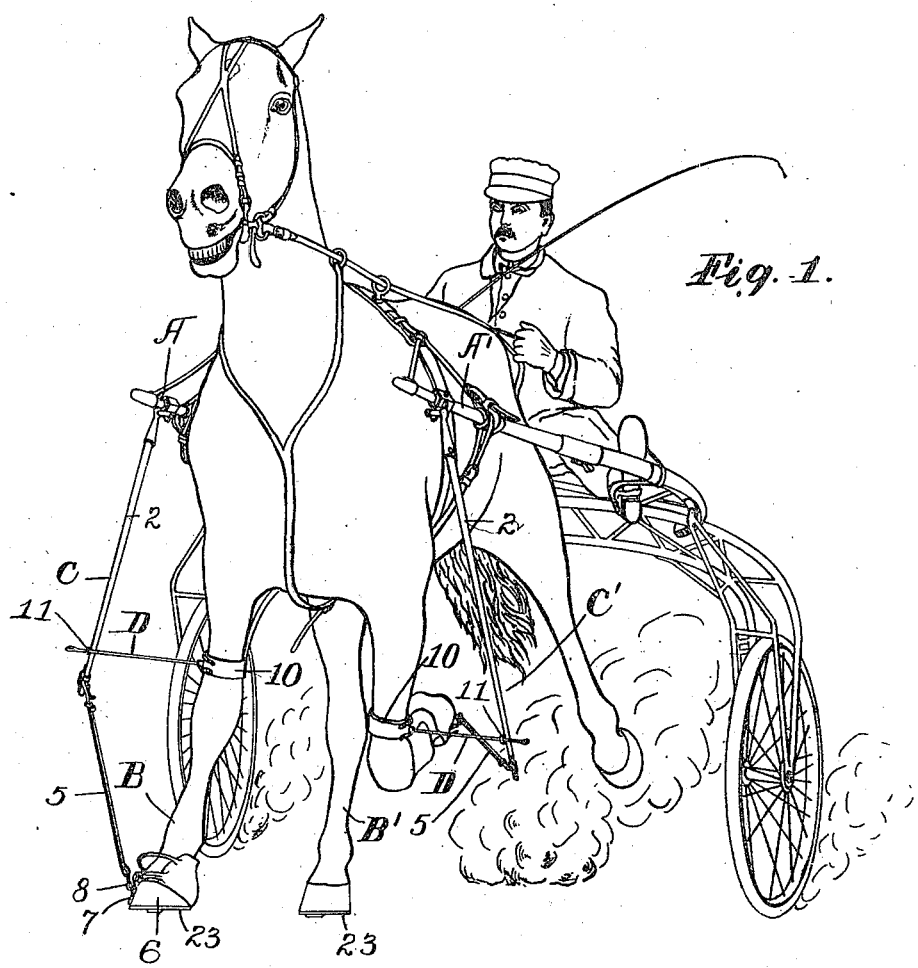

C. FREUND.
LEG SPREADER.
APPLICATION FILED FEB. 2, 1909.

949,118.

Patented Feb. 15, 1910.

2 SHEETS—SHEET 1.

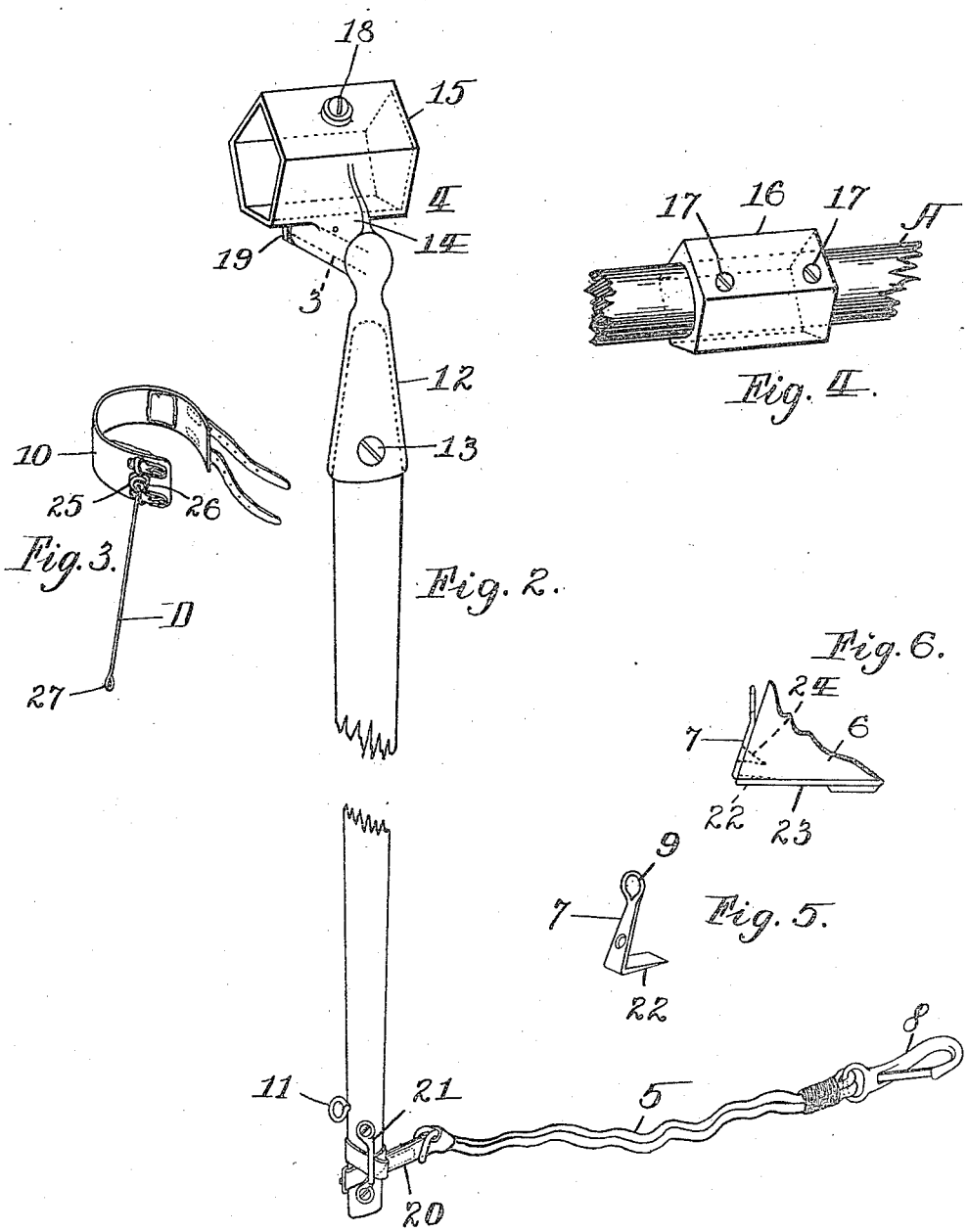

UNITED STATES PATENT OFFICE.

CONRAD FREUND, OF ST. PAUL, MINNESOTA.

LEG-SPREADER.

949,118.  Specification of Letters Patent.  Patented Feb. 15, 1910.

Application filed February 2, 1909. Serial No. 475,651.

*To all whom it may concern:*

Be it known that I, CONRAD FREUND, a citizen of the United States, residing at St. Paul, in the county of Ramsey and State of Minnesota, have invented new and useful Improvements in Leg-Spreaders, of which the following is a specification.

My invention relates to improvements in leg spreaders and has for its primary object a device of its kind which is adapted to spread the legs of horses for the purpose of preventing interference.

Among further objects is to simplify and make more effective devices which have heretofore been used in attempting to produce the above results.

In the accompanying drawings forming part of this specification, Figure 1 is a perspective view of a horse harnessed to a sulky and provided with my invention; Fig. 2 is an enlarged perspective view of the rock arm which is suspended from one of the thills showing an elastic spreader cord attached thereto, a portion of said arm being broken away; Fig. 3 is a perspective view of the stay which is to be attached to a leg of the horse and which holds the lower end of the rock arm; Fig. 4 is a perspective view of a portion of one of the thills showing the metal bushing over which the journal support for the rock arm is fastened; Fig. 5 is a perspective view of a clip which is to be secured to the horse's hoof to form a fastening for the lower end of the rock arm, and Fig. 6 is a detail diagrammatic view of a portion of a hoof showing the clip in place.

In the drawings A—A' represents the thills, B—B' the horse's legs and C—C' two sets of mechanism each of which constitutes my invention. The mechanisms C—C' are similar in construction and similar reference ordinals are applicable to the same parts in each mechanism throughout this specification.

My invention consists of a depending rock arm 2 which is journaled by means of a shaft 3 from a journal support 4, said shaft and journal support being adapted to permit the arm to swing longitudinally from one of the thills but tending to hold it in an outwardly and downwardly inclined position. The lower end of the rock arm supports an elastic cord 5 which is attached thereto and adapted to be secured to the hoof 6 by means of a clip 7 and snap 8 which engages said clip through an eye 9. The outward inclination of the arm C causes the elastic spreader cord 5 to draw the hoof outwardly thus spreading the legs apart and preventing them from interfering. The lower end of the rock arm is supported by means of a stay rod D which is mounted upon a strap collar 10 and passes loosely through an eye 11 on said arm. The function of this rod is to assist in holding the arm C in outer position and reinforcing its strength also to prevent it from moving except to a limited extent when the foot is raised and from back lashing when the legs are moving at a high rate of speed.

The rock arm 2 is provided with a cap piece 12 on its upper end which is secured in place by means of a screw 13. This cap piece has formed thereon as an integral part, the shaft 3 which is journaled in the transverse lug 14 and held therein by means of the nut 19. Said lug is cast on the lower side of the pentagonal sleeve 15. The sleeve is passed over a pentagonal bushing 16 which is secured to one of the thills A—A' by means of screws 17 and is adapted to be held upon said bushing by means of a set screw 18 passing through one section of the wall of the sleeve 15.

The elastic spreader cord 5 may be formed by any suitable construction, that shown being doubled and looped around a strap 20 which is fastened through a bracket 21 on the outer side of the lower end of the rock arm.

The clip 7 having an eye 9 upon its upper end is fastened by means of a flange 22 passing between the lower surface of the hoof and the shoe 23 and by a screw 24 passing through the clip and into the hoof.

The stay rod D is rigidly secured to the strap collar 10 by threading its inner end into a bur 25 on the side of said collar and locking the said parts together by means of a nut 26 on said threaded portion of said rod. The outer end of the stay rod D is formed with a head 27 which prevents the rod from disengaging from the rock arm, said head being too large to pass through the eye 11 on the lower end of said arm.

In operation a set of the apparatus described is secured in place by passing the sleeve 15 over the bushing 16 and turning the set screw 18 down tightly upon said bushing. The strap collar 10 is then fastened around the leg upon the knee as illustrated in Fig. 1 of the drawings and the snap hook 8 fastened through the eye 9 of the clip 7. When the horse is in action, the arm 2 swings slightly with the movement of the leg, the stay rod D serving to steady and retard this movement as well as to prevent back lashing of the parts and the elastic cord 5 serving to draw the legs apart.

In accordance with the patent statutes I have described the principle of operation of my invention together with the apparatus which I now consider to represent the best embodiment whereof, but I desire to have it understood that the construction shown is only illustrative and that the invention can be carried out by other means and applied to uses other than those above set forth within the scope of the following claims.

Having described my invention what I claim as new and desire to protect by Letters Patent is:—

1. Leg spreading apparatus, comprising, in combination, an elastic spreading cord adapted to engage the lower portion of the foot and pulling upwardly at an outwardly inclined angle, a depending supporting rock arm adapted to be journaled on a thill at its upper end and secured near its lower end to the upper end of said cord and a stay rod adapted to engage the leg and serving to assist in holding the lower end of said arm in position to cause the cord to draw the foot outwardly when in action.

2. Leg spreading apparatus, comprising, in combination, a journal support adapted to be carried upon a thill, a depending arm journaled in said support and free to rock longitudinally but held in outwardly declining position, an elastic spreader cord attached to the lower end of said arm and adapted to engage a hoof, a collar adapted to embrace a leg and a rod laterally supported by said collar, said arm having an eye through which said rod passes freely; whereby said arm is retarded from movement back and fourth by said stay rod, the hoof pulled outwardly by said cord and the tendency of back lashing of the parts reduced.

In testimony whereof, I have signed my name to this specification in the presence of two subscribing witnesses.

CONRAD FREUND.

Witnesses:
JULE DONOVAN,
F. G. BRADBURY.